United States Patent [19]

Steinhauser et al.

[11] 4,038,444

[45] July 26, 1977

[54] METHOD OF PRODUCING A METALLIC PLATING

[76] Inventors: Erwin Steinhauser, Heideweg 1, Diekholzen; Hans Litwin, Bahnhofstrasse 29, Quackenbruck, both of Germany

[21] Appl. No.: 510,645

[22] Filed: Sept. 30, 1974
(Under 37 CFR 1.47)

Related U.S. Application Data

[63] Continuation-in-part of Ser. No. 345,886, March 29, 1973, abandoned.

[30] Foreign Application Priority Data

Apr. 15, 1972 Germany .............................. 2216275

[51] Int. Cl.$^2$ .......................... B05D 5/06; B05D 3/12
[52] U.S. Cl. ..................................... 427/261; 427/264; 427/367; 427/383 R; 427/385 B; 427/386; 427/393; 106/90; 106/97
[58] Field of Search ............... 427/261, 355, 357, 360, 427/367, 369; 106/97, 90; 260/42.13, 29.65

[56] References Cited

U.S. PATENT DOCUMENTS

| 304,069 | 8/1884 | Brown | 427/355 |
|---|---|---|---|
| 1,470,378 | 10/1923 | Kleinlogel | 106/97 |
| 1,719,210 | 7/1929 | Burn | 106/97 |
| 2,028,956 | 1/1936 | Smyly | 106/97 X |
| 2,157,018 | 5/1939 | Rodwell | 106/90 X |
| 3,030,664 | 4/1962 | Wojard | 106/90 X |
| 3,240,736 | 3/1966 | Beckwith | 106/90 X |
| 3,301,799 | 1/1967 | Rothberg et al. | 260/29.65 X |
| 3,668,150 | 6/1972 | Horvitz | 106/90 |
| 3,712,825 | 1/1973 | Yocum | 426/261 X |

FOREIGN PATENT DOCUMENTS 235,134    1925    United Kingdom ................. 427/355

OTHER PUBLICATIONS

Lee et al., 37 Handbook of Epoxy Resins," McGraw-Hill Book Co., 1967, pp. 14-2,3,5,22,23, Sci. Lib.

*Primary Examiner*—Ronald H. Smith
*Assistant Examiner*—Evan K. Lawrence
*Attorney, Agent, or Firm*—Kurt Kelman

[57] ABSTRACT

A plate or plating comprising a matrix of a thermosetting synthetic resin and, optionally, Portland cement, and particulate metal elements filling the interior interstices of the matrix. The metal elements are bound to the matrix and completely surrounded by the matrix. The plate or plating maybe manufactured by intimately mixing the metal elements with a synthetic resin of low to average viscosity and Portland cement. The resultant viscous mass is placed into a mold or applied to a substrate and hardened in situ.

15 Claims, No Drawings

METHOD OF PRODUCING A METALLIC PLATING

CROSS-REFERENCE TO RELATED APPLICATION

This is a continuation-in-part of U.S. application Ser. No. 345,886, filed Mar. 29, 1973, now abandoned.

BACKGROUND OF THE INVENTION

1. Field of the Invention

The present invention relates to a plate or plating containing particulate metal elements dispersed therethrough and useful as structural elements for building facings, walls, ceilings and floors, doors, tables and the like.

2. Description of the Prior Art

Structural elements comprising a carrier substrate and a thin metal sheet bonded thereto by means of an adhesive agent have been used for such purposes. Such composite plates are expensive and have disadvantages resulting from the differences in physical properties, such as different expansion coefficients, of the carrier material and the metal plating. Atmospheric conditions, including considerable temperature variations, cause internal stresses tending to damage or destroy such composite structural elements. Structural elements consisting of metal plates of the required gage are too expensive for building purposes.

In U.S. Pat. No. 3,668,150, it has been proposed to increase the wearability of a concrete floor by shaking a dry mix of cement, powdered ferrous metal and a corrosion inhibitor on a freshly laid concrete base. The resultant wear-resistant floor surface is not a self-supporting plate useful as a structural element and it is difficult or impossible to make reproducible, smooth and evenly structured surfaces in this manner which may be subsequently colored to desired hues.

Epoxy resin and/or cement binder compositions of various types and containing a wide variety of fillers, including metal powders, are also known.

OBJECT AND SUMMARY OF THE INVENTION

It is a primary object of this invention to provide a metallic plate useful as a structural element for such purposes as hereinbefore described, which is self-supporting or may be laminated to a carrier substrate without the use of an interposed adhesive, which are substantially nonextensible, sufficiently elastic to conform to any substrate or carrier, and so economical in material and labor costs as to be available for mass production as structural elements for all purposes calling for metal plates.

The above and other objects and accomplished according to the invention with a plate or plating comprising a matrix of a hardened thermosetting synthetic resin, the matrix having a multitude of interstices in the interior thereof, and particulate metal elements filling the interstices of the matrix and bound thereto, the matrix completely surrounding the metal elements. If desired, the matrix may comprise an aqueous thermosetting resin dispersion and cement, preferably no more than an equal part by weight thereof, depending on the desired hardness and rigidity of the plate or plating.

The plate is manufactured by intimately mixing the particulate metal elements with a synthetic resin binder of low to average viscosity and, if desired, cement to obtain a viscous mass useful for molding or coating, placing the viscous mass into a mold or over a substrate, and permitting the viscous mass to harden in situ.

DESCRIPTION OF THE PREFERRED EMBODIMENTS

Useful synthetic resin binders for use in the manufacture of the plates or platings include the commercially available liquid thermosetting resin adhesives in organic solvents or in aqueous dispersions of low to average viscosity, many such binders being readily available in commerce and their specific composition forming no part of the present invention. Synthetic resin binders which fully harden at room temperature, with or without the addition of suitable curing agents, also readily available in commerce, will be preferred for economic reasons. Portland cement is a useful cement for admixture to the aqueous synthetic resin dispersions.

Any useful metal or metal alloy may be used as material for the particulate elements filling the interstices of the binder matrix, non-corroding metals or metal alloys being preferred. Economic and other reasons make copper, brass, bronze, aluminum, stainless steel and alloys thereof the preferred material for the particulate elements.

Special effects may be obtained by dispersing a colored pigment or other colorant throughout the plate, for instance mixing copper elements with blue, green or red colorants and dispersing them through the binder matrix. Useful pigments include those sold by Siegle & Co., of Germany, under the trademark "Sicoplast" and by Imhof-Stahl GmbH, of Germany, under the trademark "Luconyl".

The size of the metal elements is not critical and may vary widely anywhere from dust or powder fines to granules having dimensions up to about 800 microns. The particulate metal elements may all have the same size or particles of different sizes may be mixed.

The amount of particulate metal elements used in the plate of the present invention also is not critical as long as the matrix has dispersed therethrough a minimum amount of metal elements sufficient to impart a metallic character to the plate and no more than a minimum amount insufficient to destroy the continuity of the matrix. Preferably, the plate comprises at least about 20%, by weight, of the metal elements and the optimal amount of the metal elements in the plate is about 80%, by weight. The higher the content of synthetic resin binder the more elastic the plate. As the cement content increases, the plate becomes harder and more rigid.

Adhesive dispersions useful as binders for forming the plate matrix include commercially available products, such as aqueous butadiene-styrene copolymer dispersions sold by Huels, Germany, under the trademark "Litex". Among commercially available thermosetting resins in organic solvents, it is preferred to use epoxy resins preferably containing suitable hardeners or curing agents to catalyze and accelerate curing of the resin. For instance, epoxy resins and hardening agents therefor are sold by Schering AG, of Germany, under the trademarks "Eurepox" and "Versaduct", respectively.

In manufacturing the plates or platings of this invention, the consistency or viscosity of the mixture of the binder and metallic elements is so selected that it best serves the particular use, i.e. so that the viscous mass may be poured into a mold or coated by means of a brush or a spatula, for instance. If the mass is cast or molded, it hardens into a self-supporting plate. After hardening, the plate or plating may be ground or polished on one or both surfaces, which consist of the binder, so that the metallic elements in the interstices of the matrix become visible. Such a polished plate will have the metallic appearance of a homogenous metal plate.

According to one aspect of the invention, the binder of the viscous mass is hardened in situ on a substrate and the plate is thus laminated to the substrate without the use of any adhesive intermediate layer. It is thus possible very simply and economically to produce a composite or laminated plate having desired metallic surface characteristics. Depending on the consistency of the viscous mass, it may be cast on the substrate or it may be applied thereto by a brush or spatula to form the desired metallic plating on the substrate. The synthetic resin and, if used, cement binder harden in situ on the substrate and thereby bond the plating thereto. The lamination is so strong that the plating cannot be peeled from the substrate. If both surfaces of the substrate are surfaced in the above manner and the surface platings are polished, the resultant plate will have all the surface characteristics of a solid metal plate, with a considerable saving in expensive metallic material since the platings may be held quite thin compared to the substrate.

Any substrate material may be used to which the hardened binder of the plate will adhere in situ, useful materials including plates of asbestos cement, plywood, wood chips or fibers, plaster, synthetic resin elements or aerated cement.

The self-supporting plates and composite plates with metallic surface platings according to the present invention are very economical to manufacture, and the raw materials used in their production are much cheaper than equivalent amounts of metal used in the production of solid metal plates of like gage. In the manufacture of the composite plates, the gage or thickness of the metallic plating may be a small fraction of the total gage of the composite plate, which has an added economic advantage since the material of the substrate may be quite cheap. It is possible, of course, further to vary the structure and shape of such composite plates by applying a plurality of surface layers of the viscous mass to the substrate and to permit them to harden separately, if desired. The multi-layered surface plating may then be selectively polished, if desired, to lay bare and make visible different layers at different surface areas of the composite plate.

Since the plate of this invention has an elasticity depending on the amount of synthetic resin binder used, it will conform to any substrate, whether it is bonded thereto by means of an adhesive or has been hardened and bonded in situ to the substrate.

Environmental influences will cause no stresses in the metallic plate or plating of the invention. If it is laminated to a substrate, it will be elongated or shrink with the substrate to which it is bonded. If the substrate is flexible, it will bend with the substrate if the composite plate is applied to a curved surface, such as columns or other rounded structures. Of course, if the self-supporting plate of the present invention has a suitably selected elasticity, it may be applied directly to such rounded structures as a facing.

According to another aspect of this invention, the plate may be a multi-layered laminate, for instance a two-layered laminate of which one layer comprises, say, particulate copper elements while the other layer comprises, say, particulate stainless steel elements. This will produce a metallic plate having the appearance of a steel plate on one side and of a copper plate on the other side.

Also, if desired, different metal elements may be applied to one or both sides of the plate before the binder is permitted to harden, thus further varying the surface characteristics of the plates. The surfaces also may be suitable embossed before hardening to produce a desired appearance of the surface.

A useful viscous mass having a consistency for application by brush or spatula consists of 1.5 parts by weight each of an aqueous butadiene-styrene copolymer dispersion and Portland cement, and 10 parts by weight of stainless steel powder.

Another useful viscous mass, which may readily be hardened in situ on a cement substrate, consists of 1.5 parts by weight each of a dilute epoxy resin sold by Schering AG under the trademark "BN 7001" and containing 25% solids, and an equally diluted hardening agent for the epoxy resin sold by Schering under the trademark "Versaduct 423, 424" and containing 25% solids, the diluants being xylene or butanol, and 10 parts by weight of copper powder.

The following additional examples will further illustrate the present invention without in any way limiting the same thereto, all percentages being by weight.

EXAMPLE 1

An intimate mixture was produced of the following components:
- 37.5% of a low to average viscosity epoxy resin of bisphenol-A and epichlorhydrin sold by Schering AG under the trademark "Eurepox 780"
- 37.5% of a hardener sold by Schering under the trademark "Versaduct 460"
- 22% of a commercially available quarz flour filler
- 1.5% of highly polished copper dust sold by Eckart-Werke, Germany, as "Typ Standardgold-bronzepulver/Lackkupfer"
- 1.5% colorant sold by G. Siegle & Co. as "Typ Sicoplast-Schwarz xeP 7090"

About 74% of the above mass was poured into an open mold for making a plate. About 26% of the mass was further enriched by an addition of about 10% of the polished copper dust. This metal-enriched mass was placed upon the fresh substrate mass in the mold before it has been permitted to harden and the two layers were then permitted to harden into a laminated plate. Alternatively, the metal-enriched mass was placed upon the substrate mass after the latter had been permitted to harden, and the surface layer was then hardened in situ on the hardened substrate. In both cases, the two layers were united into a solid plate.

Hardening was effected by permitting the mass to stand several hours, for instance over night, at room temperature, i.e. an approximate temperature of about 20° C.

Since polished metal powder was used, further polishing of the surface of the hardened plate was unnecessary. While a single-layer plate could be made from a mass containing a desired amount of metal, good metallic surface properties were attained with a saving on metal by using a substrate layer containing less metal than the surface layer.

The same results were obtained by substituting other polished metal dusts, such as Eckart-Werke's "Standard-Goldbronzepulver/Lack Britaniasilber" silver, as well as polished brass, aluminum, bronze and stainless steel dusts.

Plates wherein the binder comprises cement are exemplified in the following examples:

EXAMPLE 2

An intimate mixture was produced of the following components:
15.5% of Portland cement
11% of a butadiene-styrene copolymer dispersion sold by Huels under the trademark "Litex 6301"
72.5% of copper granules having an average particle size of about 400 microns
1% of a pigment sold by Imhof-Stahl GmbH, of Mannheim, Germany, under the trademark "Luconyl"

The above viscous mass was placed in an open mold and left standing over night at room temperature. In the morning, the mass was hard and was removed in the form of a plate from the mold. When desired, surface ornaments were manually or automatically embossed on the surface of the viscous mass before it set so that the hardened plate showed the desired ornamentation. Further surface characteristics were imparted to the hardened plate by polishing, brushing or otherwise working the surface. A final polish was given to the surface and a commercially available sealant was applied thereto.

EXAMPLE 3

Plates were produced according to Example 1 from the following intimate mixture:
23% Portland cement
15% "Litex 6301"
61% stainless steel granules having an average particle size of about 380 to 420 microns, sold by Mannesmann, of Germany (18 Cr – 10 Ni — 2 Mo)
1% "Luconyl".

EXAMPLE 4

The same procedure was followed as in Example 2 but 18% Portland cement, 12% "Litex 6301", 69% of bronze or brass granules having an average particle of about 300 microns, and 1% "Luconyl" were intimately mixed.

EXAMPLE 5

The procedure of Example 2 was varied by using 31% Portland cement, 21% "Litex 6301", 47% of aluminum granules having an average particle size of about 450 to 500 microns, and 1% "Luconyl".

EXAMPLE 6

A laminated plate comprised of two layers of different composition was produced from 55% of the mass of Example 2 (composition I) and 45% of the mass of Example 3 (composition II).

The viscous mass of composition I was first placed in an open mold and, before it was set, the viscous mass of composition II was placed thereover. The two superposed masses were permitted to stand at room temperature until they formed a unitary plate whose opposite sides showed different metallic effects. Alternatively and with the same end result, composition II was poured into the mold after composition I had hardened therein.

The same surfacing may be applied to this laminated plate as described in Example 2.

It will be obvious to those skilled in the art that innumerable combinations of binder and metal components, laminations, surface working, etc., may be used to obtain an almost infinite number of desired effects. For instance, it is possible to use particulate elements of different metals and/or metal particles of different sizes in the same matrix, and/or to produce laminates of several layers each containing a different metal. Also, any adhesive dispersion equivalent to the exemplified "Litex 6301" may be used as long as the resultant binder forms a continuous matrix for the metal filler.

Furthermore, according to an important aspect of the present invention, composite structural elements may readily be produced by hardening the metal-containing plating on suitable substrate carriers. Such composite structural elements are very economical since they constitute massive elements having desired metallic surface characteristics while using relatively small amounts of the expensive metal component. These structural elements are simply constituted by the plate of this invention laminated to a substrate.

The following examples illustrate such composite structural elements:

EXAMPLE 7

An asbestos cement plate was coated with the mixture of Example 4, whose consistency was such that it could be applied by brush, and the coating was permitted to set or harden at room temperature by standing over night. Next morning, the coating had formed a metallic plating bonded to the substrate. The bond was strong over the entire area and there was no point of disengagement between the plating and the substrate.

The surface of the plating could be worked in the manner described in the examples hereinabove.

The same results were obtained with the other mixtures described in the examples, and since these mixtures could be formed into viscous masses capable of being cast, applied by brush or spatula, it was not necessary to use flat-surfaced substrates to obtain strong bonds between substrate and plating but substrates with curved or uneven surfaces were also readily usable, imparting another advantage to the invention.

EXAMPLE 8

The mass of Example 1 was applied to the surface of a wood fiber board, the mixture with the increased metal content being used. After the mass had hardened in situ on the board, a composite plate was obtained whose two layers were strongly bonded together.

Combinations of all the exemplified particulate metal element containing mixtures with various substrates, such as asbestos cement plates, plywood and wood fiber boards, plaster boards, aerated cement slabs and plastic plates were tried, and all were found to result in composite plates whose metallic plating strongly adhered to the substrate.

It is obvious from these examples that many other modifications will be useful, with varying percentages of the components, different binders forming the matrix and a variety of particulate metal elements within the scope of the present invention. For instance, a wide range of particle size may be used for the particulate metal elements and particle sizes averaging as little as 100 microns and up to about 800 microns have been found useful, the preferred range being about 300 to 500 microns but good results being obtainable with metal particles of an average size of about 150 to 200 microns.

The particle size is selected according to the intended use and desired effect, Example 1 indicating that even dust-sized particles are useful. Differing results may be obtained by using particles of different sizes in the same mixture. For instance, special esthetic effects were achieved by comminuting a thin metal foil and mixing the resultant parings with a metal powder.

The plate of the present invention, whether self-supporting or used as a plating on a carrier substrate, has unusually wide utility as a building material and can be used, for instance, as a cheap substitute for all-metal plates while achieving much more varigated effects than the more expensive metal plates. The plate or plating is water-impermeable and may be cleaned with almost any commercially available cleanser. Its life is almost unlimited and it may be used in the interior as well as the exterior of buildings.

The bending or fatigue strength, water absorption, gross density and other properties of plates produced according to this invention are excellent, as will be attested by the following results achieved with a composite plate consisting of an asbestos cement substrate and a plating having an average thickness of 0.4 mm (varying between 0.3 and 0.5 mm) and consisting of the mixture of Example 4. Six such plates were tested, with the following results:

Bending or fatigue strength: The test plates were supported at their ends on supports spaced 18 cm apart and a weight P was placed on each plate intermediate its supported ends in longitudinal and transverse directions. The average value for the longitudinally supported test plates was 425 kp/cm$^3$ and for the transversely supported test plates 290 kp/cm$^3$.

Gross density: Average value 2.02 g/cm$^3$.

Resistance to frost: After exposure to sub-zero temperatures, no cracks or fissures were found in any plate.

Resistance to SO$_2$: The plates were subjected to the severe test standards of DIN (Germany Industry Standard) 500 18 SFW 2.0 S up to 30 cycles. No discernible faults were found in the plates after the tests.

No changes in the plates were found after the following tests: boiling in water for six hours at 90° C., soaking in hot water for 96 hours at 95° C., soaking in water for extended periods, etc.

Shrinkage and extension: Maximal dimensional changes of an average of a maximum of 0.42 mm/m were found in a variety of tests with a variety of plates and platings.

Bonding: Various platings on plaster boards were tested and the adhesion of the platings to the substrates was found to be 2.3 kg/cm$^3$.

"Litex 6301" is an aqueous butadiene-styrene copolymer dispersion containing about 46 – 47%, by weight, solids, a density of 1.01 at 23° C and a viscosity of about 15 to 20 cp (rheometer A/III). Instead of "Litex 6301", it is also possible to use "Litex A20" or "Litex A21", both of which are similar aqueous dispersions having a solids content of about 50%, by weight, a density of about 1.04 at 23° C and a viscosity of about 12 to 14 cp.

"Eurepox" has an epoxy value of 0.51 to 0.56 and a viscosity of about 7 to 11 cp at 25° C.

As the examples indicate, the invention makes use of a metal containing mass which may be poured or cast at ambient temperatures to produce layers containing a variety of metals in a manner not possible with any conventional process. Without difficulty and without producing any disadvantageous results, metals with totally different properties, including different expansion coefficients, may be combined in laminated plates without any danger of the laminae disassociating from each other. Thus, it is possible, for instance, to laminate a layer containing a noble metal to a layer containing copper, without regard to the physical properties of the different metals used. Different metals may be combined in a single layer or laminated layers each containing a different metal may be combined into an integral structure.

In general, plates of the present invention are produced in the following manner:

A castable mixture of metal and binder, such as exemplified hereinabove, is cast, poured, or otherwise applied to a substrate. This substrate may serve solely as a carrier for the cast mixture and may be removed therefrom after the mixture has hardened into a self-supporting structure, or the substrate may remain united with the hardened structure. After the castable mixture is applied to the substrate, it is mechanically or otherwise smoothed with any suitable tool. By means of preferably circular motions, the metal particles on the surface of the applied layer are pressed together and rubbed against each other until the metallic particles practically form the entire surface of the layer. Such a homogeneously appearing metallic surface is best attained with metallic particles of different sizes. In other words, by using fines as well as coarser particles, all the interstices between the coarser particles are substantially filled with the fines. Depending on the amount of metal particles in the mixture, the metal particles will form more or less the entire surface of the smoothed surface.

Smoothing of the surface is continued until the layer is more or less dry to the touch. Afterwards, it is left standing for several hours, for instance over night, to permit the layer to harden so that the surface may be polished, if desired.

For instance, if it is desired to laminate a layer of noble metal, such as silver, to a layer of copper, the mixture of Example 2 may be applied to a substrate of flexible cardboard. This layer is smoothed to a desired extent until its surface has a desired porosity. After the layer is dry to the touch, a similar mixture containing a noble metal instead of copper is applied to spaced portions of the layer, depending on the desired configuration, this layer again being smoothed.

It is obvious from the description and examples that the variations and combinations of binders and metals, as well as laminations, are practically without limit. The produced plates may be rigid or flexible.

What is claimed is:

1. A method of producing a metallic plating comprising the steps of applying to a substrate a settable pasty intimate mixture consisting of a matrix of an aqueous dispersion of a thermosetting synthetic resin binder and Portland cement, the matrix having a multitude of interstices in the interior thereof and metal particles filling the interstices and bound to the matrix, the binder completely surrounding the metal particles and the amount of the metal particles being sufficient to impart a metallic surface character to the applied layer after subsequently smoothing the surface thereof but insufficient to destroy the continuity of the binder, smoothing the surface of the applied mixture before the setting thereof until the metal particles on the surface of the applied layer are pressed together and practically form the entire surface of the layer and the applied layer is substantially dry to the touch, and subsequently permitting the layer to stand at ambient temperature to permit the resin and cement to set.

2. The method of claim 1, wherein the synthetic resin is a butadiene-styrene copolymer.

3. The method of claim 1, wherein the synthetic resin is a thermosetting resin and the matrix comprises a curing agent for the thermosetting resin.

4. The method of claim 3, wherein the synthetic resin is epoxy resin.

5. The method of claim 1, the mixture comprising about 20% to 80%, by weight, of the metal particles.

6. The method of claim 1, wherein the metal of the particle is selected from the group consisting of copper, brass, bronze, aluminum, stainless steel and alloys thereof.

7. The method of claim 1, wherein the size of the metal particles ranges up to about 800 microns.

8. The method of claim 1, the mixture further comprising a colored pigment dispersed therethrough.

9. The method of claim 1, wherein the matrix comprises no more than an equal part by weight of Portland cement.

10. The method of claim 1, wherein the substrate is a plate of asbestos cement, plywood, wood fibers, plaster, synthetic resin elements or aerated cement.

11. The method of claim 1, the mixture comprising about 75%, by weight, of a matrix consisting of substantially equal parts of an epoxy resin and a hardening agent therefor, and about 25%, by weight, of a particulate inorganic filler, including the metal particles.

12. The method of claim 1, the mixture comprising between about 25% and 55%, by weight, of a matrix consisting of butadiene-styrene copolymer and Portland cement, and about 75% to 45%, by weight of the particulate metal particles.

13. The method of claim 12, wherein the matrix consists of about 10% to 20% of the copolymer and about 15% to 30% of the cement, based on the total weight.

14. The method of claim 1, comprising the further step of polishing the surface of the set layer to impart to it the metallic appearance of a homogeneous metal plating.

15. The method of claim 1, wherein the resin is a butadiene-styrene copolymer, and the metal is a nonferrous metal, and before the layer is permitted to set, a second layer is applied to the substantially dry layer at spaced surface portions thereof, the second layer also comprising a like pasty intimate mixture of an aqueous dispersion of a butadiene-styrene copolymer and Portland cement but a metal of another color, the surface of the applied second layer being smoothed before the setting thereof until the metal particles on the surface of the applied layer are pressed together and practically form the entire surface of the layer and the second surface layer is substantially dry to the touch, and the two laminated layers being subsequently permitted to stand at ambient temperature to permit the resin and cement to set.

* * * * *